(12) United States Patent
Kashiwa et al.

(10) Patent No.: US 11,021,272 B2
(45) Date of Patent: Jun. 1, 2021

(54) CONTROL MOMENT GYROSCOPE

(71) Applicant: MITSUBISHI ELECTRIC CORPORATION, Chiyoda-ku (JP)

(72) Inventors: Munetaka Kashiwa, Chiyoda-ku (JP); Kazuhiko Fukushima, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 361 days.

(21) Appl. No.: 16/070,086

(22) PCT Filed: Jul. 25, 2016

(86) PCT No.: PCT/JP2016/071709
§ 371 (c)(1),
(2) Date: Jul. 13, 2018

(87) PCT Pub. No.: WO2017/138165
PCT Pub. Date: Aug. 17, 2017

(65) Prior Publication Data
US 2019/0016480 A1   Jan. 17, 2019

(30) Foreign Application Priority Data

Feb. 10, 2016  (JP) .............................. JP2016-023440

(51) Int. Cl.
*B64G 1/28*   (2006.01)
*G01C 19/18*   (2006.01)
(Continued)

(52) U.S. Cl.
CPC .............. *B64G 1/286* (2013.01); *B64G 1/28* (2013.01); *F03G 3/08* (2013.01); *G01C 19/16* (2013.01); *G01C 19/18* (2013.01); *H02K 7/14* (2013.01)

(58) Field of Classification Search
CPC ........ B64G 1/286; G01C 19/16; G01C 19/18; F03G 3/08
See application file for complete search history.

(56) References Cited

U.S. PATENT DOCUMENTS 3,442,143 A * 5/1969 Schlitt ..................... G01C 19/18
74/5.6 R
3,483,760 A * 12/1969 Hurlburt ................. G01C 19/16
74/5 F
(Continued)

FOREIGN PATENT DOCUMENTS

EP   2 955 114 A1   12/2015
JP   2009-168817 A   7/2009
(Continued)

OTHER PUBLICATIONS

Extended European Search Report dated Jan. 18, 2019 in European Patent Application No. 16889866.6 citing document AO therein, 9 pages.

(Continued)

*Primary Examiner* — William Kelleher
*Assistant Examiner* — Gregory T Prather
(74) *Attorney, Agent, or Firm* — Xsensus LLP (57) ABSTRACT

A control moment gyroscope includes: an inner gimbal; a rotor that is held by the inner gimbal to be rotatable around a spin axis; a spin motor that is disposed on the inner gimbal, and that rotates the rotor around the spin axis; a stator that holds the inner gimbal to be rotatable around a gimbal axis that is perpendicular to the spin axis; gimbal bearings that are disposed between the inner gimbal and the stator to face each other from opposite sides of a plane that is perpendicular to the gimbal axis and that includes the spin axis, to be in contact with the plane in question, or to include the plane in question; and a torque module that is disposed on (Continued)

the stator, and that rotates the inner gimbal around the gimbal axis.

8 Claims, 6 Drawing Sheets

(51) Int. Cl.
*G01C 19/16* (2006.01)
*H02K 7/14* (2006.01)
*F03G 3/08* (2006.01)

(56) References Cited

U.S. PATENT DOCUMENTS

| | | | | |
|---|---|---|---|---|
| 3,630,091 A * | 12/1971 | Scarborough | ......... | G01C 19/02 73/504.18 |
| 4,242,917 A * | 1/1981 | Bennett | ................ | G01C 19/16 74/5 F |
| 4,267,737 A * | 5/1981 | O'Connor | ............. | G01C 19/16 74/5.47 |
| 2007/0240529 A1 * | 10/2007 | Zeyher | ..................... | F03G 3/08 74/5.44 |
| 2009/0100957 A1 * | 4/2009 | Winkel | ................ | F16C 33/581 74/5 R |
| 2009/0200428 A1 | 8/2009 | Smith et al. | | |
| 2009/0235765 A1 * | 9/2009 | Buchele | ................ | B64G 1/286 74/5.47 |
| 2010/0000349 A1 | 1/2010 | Stevens et al. | | |
| 2010/0264290 A1 * | 10/2010 | Camarasa | ............. | B64G 1/283 248/603 |
| 2012/0199697 A1 * | 8/2012 | Nagabhushan | ........ | B64G 1/286 244/165 |
| 2014/0026688 A1 * | 1/2014 | Davis | .................... | G01C 25/00 74/5.7 |
| 2016/0298962 A1 * | 10/2016 | Lee | ........................ | G01C 19/16 |

FOREIGN PATENT DOCUMENTS

JP  5357558 B2  12/2013
JP  2014-38085 A  2/2014

OTHER PUBLICATIONS

International Search Report dated Oct. 11, 2016, in PCT/JP2016/071709 filed Jul. 25, 2016.

* cited by examiner

CONVENTIONAL EXAMPLE

CONTROL MOMENT GYROSCOPE

TECHNICAL FIELD

The present invention relates to a control moment gyroscope that imparts torque to a spacecraft to control attitude of the spacecraft.

BACKGROUND ART

Control moment gyroscopes (CMGs) are used as attitude control actuators that are mounted to spacecraft for performing attitude control of the spacecraft by imparting torque to the spacecraft.

In CMGs, a rotor that is supported by spin bearings, and that rotates around a spin axis at high speed, is rotated around a gimbal axis that is perpendicular to the spin axis using a torque module to generate gyroscopic torque around an output shaft that is perpendicular to the spin axis and the gimbal axis that is proportional to the angular momentum of a rotor and angular speed around the gimbal axis. This generated torque is transmitted from the CMG to the spacecraft through a spacecraft interface to control attitude of the spacecraft.

Here, since the torque that the CMG outputs is transmitted to the spacecraft by passing through a load transmission pathway from the rotor to the spacecraft interface, transmission efficiency of the torque that the CMG outputs depends significantly upon transfer characteristics of the CMG body structures in the load transmission pathway from the rotor to the spacecraft interface. In conventional CMGs, in addition to including a thin, low-rigidity rotor cover for sealing the rotor in a vacuum in the load transmission pathway from the rotor to the spacecraft interface, since a plurality of structural parts other than the rotor cover are disposed in series in the load transmission pathway in particular, the load transmission pathway itself is long, and the supporting rigidity of the CMG body structure in the load transmission pathway is low.

In consideration of such conditions, conventional CMGs have been proposed in which, in addition to using large-diameter gimbal bearings as gimbal bearings that rotate the rotor around a gimbal axis, a load transmission pathway from a rotor to a spacecraft interface is made shorter and more rigid by disposing those large-diameter gimbal bearings between a spin axis and a torque module of a rotor so as to be in a position that is close to the spin axis (see Patent Literature 1, for example).

CITATION LIST

Patent Literature

Patent Literature 1: Japanese Patent No. 5357558 (Gazette)

SUMMARY OF THE INVENTION

Problem to be Solved by the Invention

In the conventional CMG that is disclosed in Patent Literature 1, although the gimbal bearings are disposed in positions that are closer to the spin axis than torque module in terms of distance, since they are disposed between the spin axis and the torque module, distances arise between the spin axis and the gimbal bearings, however slight. Because of that, during rotation of the rotor, moment loads that correspond to the distances between the spin axis and the gimbal bearings also act on the gimbal bearings in addition to radial loads that result from shaft vibration in the axial direction of the spin axis, due to shaft vibration in the axial direction that is synchronous with rotation of the spin axis that arises as a result of alignment errors between two pairs of spin bearings that rotatably support the rotor. Because of that, working life of the gimbal bearings is shorter than when only radial loads act on to the gimbal bearings due to shaft vibration in the rotor. Furthermore, although short, an inner gimbal construction exists in which flexure arises in the load transmission pathway from the rotor to the gimbal bearings in response to the shaft vibration of the rotor. Because of that, shaft vibration that arises in the rotor is amplified by resonance characteristics that result from the inner gimbal construction, and is transmitted to the spacecraft while being transmitted from the rotor to the spacecraft interface through the gimbal bearings. The shaft vibrations that are transmitted to the spacecraft acts on observation equipment that is mounted to the spacecraft and on the attitude of the spacecraft itself as disturbances, and constitute a significant problem for spacecraft that require high-precision observation and attitude control. In addition, because the gimbal bearings are disposed at positions that are offset in a direction that is parallel to the shaft axes of the gimbal bearings relative to the shaft axis of the spin axis, it is necessary to make the inner gimbal that exists in the load transmission pathway from the rotor to the gimbal bearings have a rigid construction to suppress the occurrence of flexure that results from shaft vibration of the rotor. Because of that, it is necessary to give the inner gimbal a thick and rigid shape, increasing the inner gimbal in size, and another problem is that overall size of the CMG is increased.

The present invention aims to solve the above problems and provides a compact control moment gyroscope that suppresses the occurrence of moment loads that act on gimbal bearings as a result of shaft vibration of a rotor to enable extension of service life of the gimbal bearings, and that also eliminates structures in a load transmission pathway from a spin axis to the gimbal bearings that give rise to flexure as a result of the shaft vibration of the rotor to enable increases in disturbances that act on a spacecraft as a result of the shaft vibration of the rotor to be suppressed.

Means for Solving the Problem

A control moment gyroscope according to the present invention includes: an inner gimbal; a rotor that is held by the inner gimbal so as to be rotatable around a spin axis; a spin motor that is disposed on the inner gimbal, and that rotates the rotor around the spin axis; a stator that holds the inner gimbal so as to be rotatable around a gimbal axis that is perpendicular to the spin axis; gimbal bearings that are disposed between the inner gimbal and the stator so as to face each other from opposite sides of a plane that is perpendicular to the gimbal axis and that includes the spin axis, so as to be in contact with the plane, or so as to include the plane; and a torque module that is disposed on the stator, and that rotates the inner gimbal around the gimbal axis.

Effects of the Invention

According to the present invention, gimbal bearings are disposed so as to face each other from opposite sides of a plane that is perpendicular to a gimbal axis and that includes a spin axis. Thus, because moment loads that act on the gimbal bearings due to shaft vibration of a rotor do not arise, extension of service life of the gimbal bearings can be achieved. Because there are no structures in a load transmission pathway from a spin shaft to the gimbal bearings that give rise to flexure as a result of the shaft vibration of the rotor, the shaft vibration of the rotor will not be amplified and transmitted to the spacecraft, enabling disturbances that act on the spacecraft to be kept small.

In addition, because an inner gimbal is rigid against the shaft vibration of the rotor 1 by configuration irrespective of its thickness and shape, dimensions of the inner gimbal can be shortened, enabling the control moment gyroscope to be reduced in size.

DESCRIPTION OF EMBODIMENTS

Embodiment 1

Figure 1:
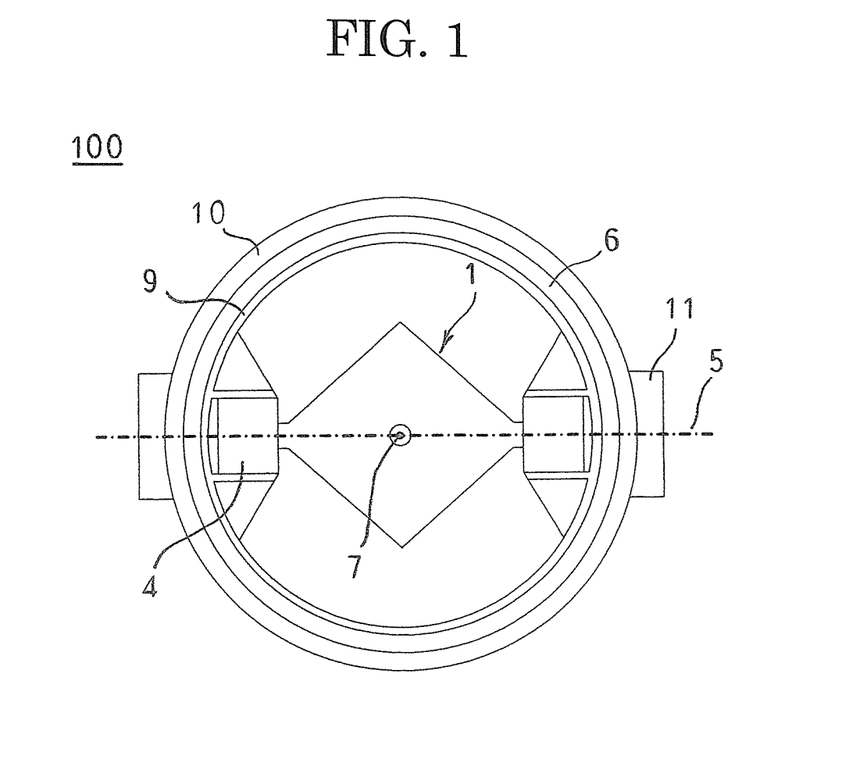
FIG. 1 is a top plan that shows a control moment gyroscope according to Embodiment 1 of the present invention.
Figure 2:
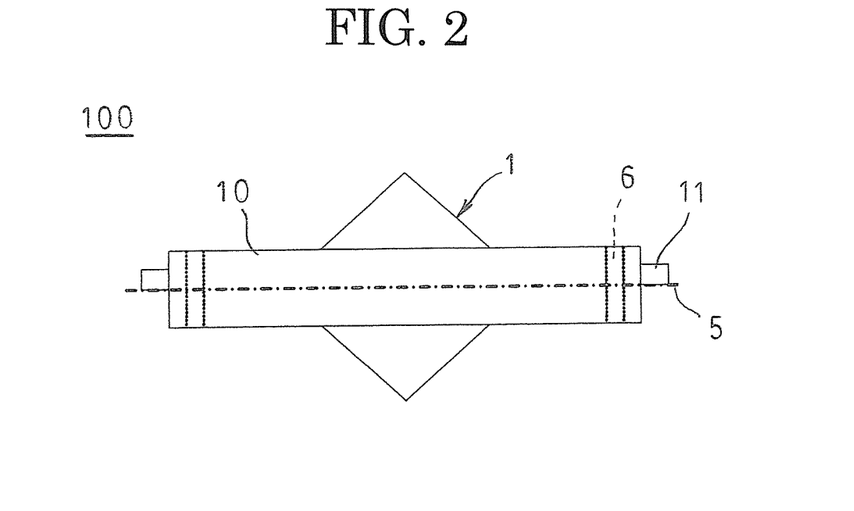
FIG. 2 is a side elevation that shows the control moment gyroscope according to Embodiment 1 of the present invention.
Figure 3:
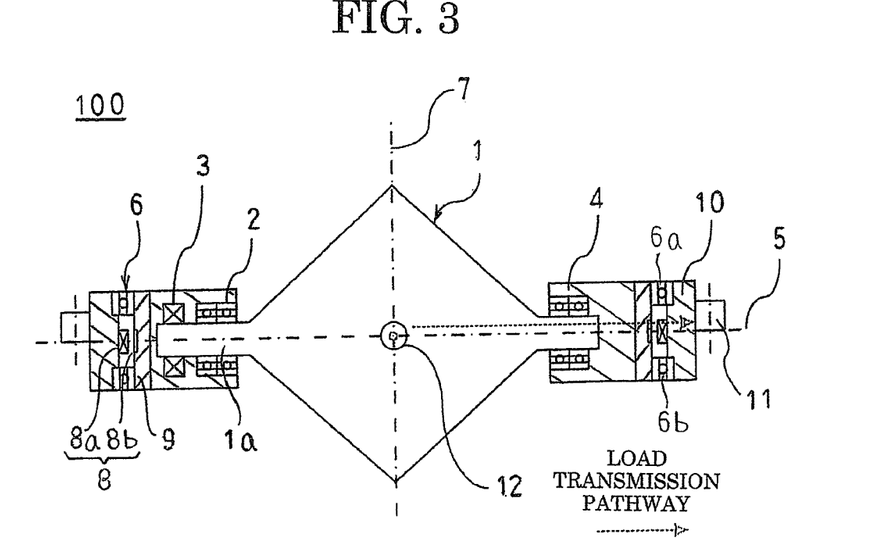
FIG. 3 is a cross section that shows the control moment gyroscope according to Embodiment 1 of the present invention.
Figure 4:
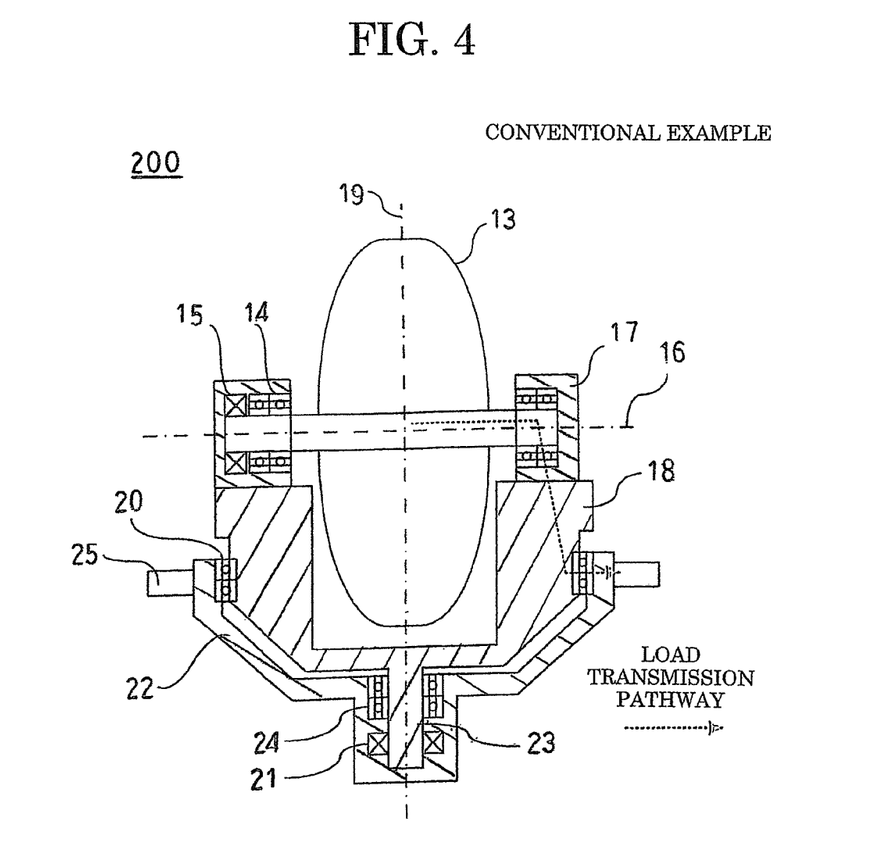
FIG. 4 is a cross section that shows a conventional control moment gyroscope.

FIG. 1 is a top plan that shows a control moment gyroscope according to Embodiment 1 of the present invention, FIG. 2 is a side elevation that shows the control moment gyroscope according to Embodiment 1 of the present invention, and FIG. 3 is a cross section that shows the control moment gyroscope according to Embodiment 1 of the present invention. FIG. 4 is a cross section that shows a conventional control moment gyroscope.

In FIGS. 1 through 3, a control moment gyroscope 100 includes: a stator 10 that is produced so as to have a cylindrical shape; an inner gimbal 9 that is produced so as to have a cylindrical shape, that is supported by the stator 10 so as to be rotatable around a gimbal shaft 7, and that is disposed inside the stator 10; a torque module 8 that is disposed on the stator 10, and that rotates the inner gimbal 9 around the gimbal shaft 7; a rotor 1 that is supported by the inner gimbal 9 so as to be rotatable around a spin axis 5 that is perpendicular to the gimbal axis 7, the rotor 1 being disposed inside the inner gimbal 9; a spin motor 3 that is disposed on the inner gimbal 9, and that rotates the rotor 1 around the spin axis 5; and a spacecraft interface 11 that is disposed on the stator 10.

The rotor 1 is constituted by: a shaft 1a that has two ends that are supported by two pairs of spin bearings 2 so as to be rotatable around the spin axis 5; and an inertial element that is disposed integrally on the shaft 1a, and that increases moment of inertia around the spin axis 5. The inertial element is generally constituted by a rotating ring, or a cylindrical or conical shell, that has a mass at a position that is distanced from the spin axis 5. Moreover, during tests on the ground, a rotor cover (not shown) or the like for sealing the rotor 1 in a vacuum is mounted so as to cover the rotor 1 with the aim of preventing torque loss due to wind loss during rotation of the rotor 1.

The spin bearings 2 are disposed on the two ends of the shaft 1a so as to support the rotor 1 so as to be rotatable around the spin axis 5. The spin bearings 2 are generally used in a configuration in which two or more angular contact ball bearings that have different angles of ball contact inside the bearings are combined at each end of the shaft 1a of the rotor 1, and in addition to having a high degree of rigidity against radial loads and thrust loads that act on the spin bearings 2 during rotation of the rotor 1, also have a high degree of rigidity against moment loads. Furthermore, in order to alleviate heat deformation of the rotor 1 that accompanies changes in the ambient temperature environment and shaft misalignment of the spin bearings 2 that are disposed at the two ends of the shaft 1a, one pair of the two pairs of spin bearings 2 that are disposed at the two ends of the shaft 1a are fixed bearings that rigidly support bearing outer rings relative to spin bearing housings 4, and the other pair is constituted by suspended bearings that are supported in a state in which air gaps are disposed relative to the spin bearing housings 4 and a viscous fluid or an elastic member is enclosed therein.

Although not shown, the spin motor 3 is constituted by: a spin motor rotor on which permanent magnets are disposed; and a spin motor stator on which an excitation winding is disposed. The spin motor rotor of the spin motor 3 is fixed to the shaft 1a, and the spin motor stator of the spin motor 3 is fixed to a spin bearing housing 4. The spin motor rotor and the spin motor stator are disposed so as to face each other so as to have a slight air gap. The spin motor 3 excites the winding inside the spin motor stator in response to rotation commands to the rotor 1 to rotate the rotor 1 around the spin axis 5.

The spin bearing housings 4 are mounted to inner circumferential surfaces of the inner gimbal 9 so as to face each other across the gimbal axis 7. The spin bearings 2 and the spin motor 3 are disposed inside the spin bearing housings 4. The outer rings of the spin bearings 2 and the spin motor stator of the spin motor 3 are fixed to and supported by the spin bearing housings 4. The rotor 1 is thereby mounted to the inner gimbal 9 so as to be rotatable around the spin axis 5 which is perpendicular to the gimbal axis 7.

Gimbal bearings 6 are disposed between the inner gimbal 9 and the stator 10. The inner gimbal 9 is thereby supported by the stator 10 so as to be able to rotate around the gimbal axis 7. The gimbal bearings 6 are used in a configuration in which two angular contact ball bearings 6a and 6b that have different angles of ball contact inside the bearings are combined, and in addition to having a high degree of rigidity against radial loads and thrust loads that act on the gimbal bearings 6 during rotation of the rotor 1, also have a high degree of rigidity against moment loads. Here, the pair of angular contact ball bearings 6a and 6b that constitute the gimbal bearings 6 are disposed between the inner gimbal 9 and the stator 10 so as to be on opposite sides of a plane that is perpendicular to the gimbal axis 7 and that includes the spin axis 5. Ring-shaped bearings that have an aperture size such that the inner gimbal 9 fits inside an inner ring of the gimbal bearings 6 are used for the gimbal bearings 6 in order to support an outer circumference of the cylindrical inner gimbal 9 rotatably.

The torque module 8 is constituted by: a gimbal motor stator 8a on which an excitation winding is disposed; and a gimbal motor rotor 8b on which permanent magnets are disposed. The gimbal motor stator 8a is disposed on and fixed to an inner circumferential surface of the stator 10 around its entire circumference, and the gimbal motor rotor 8b is disposed on and fixed to an outer circumferential surface of the inner gimbal 9 around its entire circumference. Here, the gimbal motor stator 8a and the gimbal motor rotor 8b are disposed so as to face each other so as to have a slight air gap. The gimbal motor stator 8a and the gimbal motor rotor 8b are disposed on a plane that includes the spin axis 5 that is perpendicular to the gimbal axis 7. Thus, the torque module 8 is disposed so as to line up with the gimbal bearings 6 in a direction that is parallel to the shaft axis of the gimbal axis 7 so as to be in close proximity to the gimbal bearings 6. Here, the torque module 8 being "in close proximity" to the gimbal bearings 6 means a distance between the torque module 8 and the gimbal bearings 6 in the direction that is parallel to the shaft axis of the gimbal axis 7 is less than the largest dimension among a dimension of the torque module 8 in the direction that is parallel to the shaft axis of the gimbal axis 7 and a dimension of the gimbal bearings 6 in the direction that is parallel to the shaft axis of the gimbal axis 7.

Moreover, in FIG. 3, the torque module 8 is disposed between the pair of angular contact ball bearings that constitute the gimbal bearings 6. Here, a configuration may be adopted in the torque module 8 that includes an angle sensor for measuring relative rotational angle between the inner gimbal 9 and the stator 10 such as an encoder, a resolver, or a tachometer, for example. However, it is desirable for the angle sensor that is used to measure the relative rotational angle of the inner gimbal 9 and the stator 10 without contact. A configuration may also be adopted in the torque module 8 that includes a device that is suited to transmitting rotation commands and electric power, or alternatively rotation commands or electric power only, to the spin motor 3 beyond the rotating boundary surface, such as a slip ring, for example. The torque module 8 drives the rotor 1, which is supported by the inner gimbal 9 by means of the spin bearing housings 4, and which rotates around the spin axis 5 at high speed, to rotate around the gimbal axis 7 by rotating the inner gimbal 9 around the gimbal axis 7 in response to external rotation commands.

The inner gimbal 9 is produced so as to have a cylindrical shape, and is disposed between the spin bearing housings 4 and the gimbal bearings 6. Here, the spin bearing housings 4 are fixed to an inner circumference of the inner gimbal 9, and the inner rings of the gimbal bearings 6 are fixed to an outer circumference of the inner gimbal 9. Moreover, the shape of the inner gimbal 9 is not limited to a cylindrical shape, and various shapes are conceivable in a range that satisfies its function. Furthermore, the method for fixing the inner gimbal 9 and the spin bearing housings 4 is also not limited to the method of direct fixing to the inner circumference of the inner gimbal 9, and a configuration may be adopted in which mounting ribs are disposed on the inner gimbal 9, and the spin bearing housings 4 are fixed to the inner gimbal 9 by means of those ribs. In addition, it is desirable for the inner gimbal 9 to be a shape that is as thin as possible within a range that enables the spin bearing housings 4 and the inner ring of the gimbal bearings 6 to be coupled sufficiently rigidly relative to the load that the rotor 1 outputs.

The stator 10 is produced so as to have a cylindrical shape, the outer rings of the gimbal bearings 6 are fixed to the inner circumference of the stator 10, and the torque module 8 is disposed therein. In addition, the spacecraft interface 11 is disposed on an outer circumferential surface or a side surface of the stator 10. Here, the shape of the stator 10 is not limited to a cylindrical shape, and various shapes in a range that satisfies its function are conceivable.

The spacecraft interface 11 is disposed between the stator 10 and a CMG mounting portion of a spacecraft (not shown). The spacecraft interface 11 is disposed on an outer circumference or a side surface of the stator 10, and is connected rigidly to a CMG mounting portion of the spacecraft around an entire circumference or a portion of the stator 10 using bolts, etc. Here, the spacecraft interface 11 may constitute a portion of the stator 10, or may be constituted by mounting a separate part to the stator 10. In this case, the spacecraft interface 11 is disposed on the outer circumferential surface of the stator 10 so as to be in contact with to the shaft axis of the spin axis 5, but may be disposed at a position that is on the shaft axis of the spin axis 5 or that is in close proximity to the shaft axis of the spin axis 5. Furthermore, the spacecraft interface 11 may be configured so as to have an annular shape, and be disposed on the outer circumferential surface of the stator 10 such that a plane that is perpendicular to the gimbal axis 7 and that includes the spin axis 5 passes therethrough, or so as to contact the plane in question, or so as to be in close proximity to the plane in question. Here, the spacecraft interface 11 being "in close proximity" to the plane that is perpendicular to the gimbal axis 7 and that includes the spin axis 5 means that a distance between the spacecraft interface 11 and the plane in question in a direction that is parallel to the shaft axis of the gimbal axis 7 is less than the largest dimension among a dimension of the spacecraft interface 11 in the direction that is parallel to the shaft axis of the gimbal axis 7, in other words, its thickness, a diameter of the shaft 1a of the rotor 1, and a dimension of the stator 10 in the direction that is parallel to the shaft axis of the gimbal axis 7.

In the CMG 100 that is configured in this manner, the rotor 1, which has two ends of its shaft 1a supported by the two pairs of spin bearings 2, is driven to rotate at high speed around the spin axis 5 by the spin motor 3. The inner gimbal 9, which is supported by the gimbal bearings 6, is driven to rotate around the gimbal axis 7 by the torque module 8. Thus, the rotor 1 that is rotating at high speed around the spin axis 5 also rotates around the gimbal axis 7. Thus, output torque that is proportional to angular momentum that is generated by the moment of inertia and the angular speed of the rotor 1 that is rotating at high speed and angular speed around the gimbal axis 7 is outputted around a torque output shaft 12 that is perpendicular to two axes, i.e., the spin axis 5 and the gimbal axis 7. The torque that is outputted around the torque output shaft 12 is transmitted to the spacecraft through the spacecraft interface 11 that is disposed on the stator 10 to control attitude of the spacecraft.

Next, in order to explain effects according to Embodiment 1, construction of a conventional CMG 200 will be briefly explained using FIG. 4.

The conventional CMG 200 includes: a stator 22; an inner gimbal 18 that is supported on the stator 22 by means of gimbal bearings 20 and 24, and that is disposed so as to be rotatable around a gimbal axis 19; a torque module 21 that is disposed on the stator 22, and that rotates the inner gimbal 18 around the gimbal axis 19; spin bearing housings 17 that are mounted to the inner gimbal 18; a rotor 13 that is supported on the spin bearing housings 17 by means of the spin bearings 14, and that is disposed so as to be rotatable around a spin axis 16; a spin motor 15 that is disposed in one of the spin bearing housings 17, and that rotates the rotor 13 around the spin axis 16; and a spacecraft interface 25 that is disposed on the stator 22.

In the conventional CMG 200 that is configured in this manner, the gimbal bearings 20 are disposed in positions that are closer to the spin axis 16 than the torque module 21 in terms of distance, configuring a load transmission pathway that is indicated by broken lines in FIG. 4. Thus, during rotation of the rotor 13, because moment loads that correspond to the distances between the spin axis 16 and the gimbal bearings 20 also act on the gimbal bearings 20 in addition to radial loads that result from shaft vibration in the axial direction of the spin axis 16, due to shaft vibration in the axial direction of the spin axis 16 that is synchronous with rotation of the rotor 13 that arises as a result of alignment errors between two pairs of spin bearings 14 that rotatably support the rotor 13, working life of the gimbal bearings 20 is shorter. Furthermore, the inner gimbal 18 in which flexure arises in response to the shaft vibration of the rotor 13 exists in the load transmission pathway from the rotor 13 to the gimbal bearings 20. Because of that, shaft vibration that arises in the rotor 13 is amplified by resonance characteristics in a vibrational mode that gives rise to flexure relative to the shaft vibration of the inner gimbal 18, and is transmitted to the spacecraft while being transmitted from the rotor 13 to the spacecraft interface 25 through the gimbal bearings 20. The shaft vibrations that are transmitted to the spacecraft act on observation equipment that is mounted to the spacecraft and on the attitude of the spacecraft itself as disturbances. In addition, since the gimbal bearings 20 are configured so as to be disposed at positions between the spin axis 16 and the torque module 21 that are close to the spin axis 16, not only is the dimension of the stator 22 on which the gimbal bearings 20 and the torque module 21 are disposed lengthened, but it is also necessary for the dimensions of the inner gimbal 18 that is driven to rotate by the torque module 21 to be lengthened in order to be connected to the torque module 21, and as a result the external shape of the entire CMG 200 is enlarged.

Thus, in the conventional CMG 200, in addition to radial loads that result from the shaft vibration in the axial direction of the spin axis 16, moment loads that are proportional to the distance between the spin axis 16 and the gimbal bearings 20 act on the gimbal bearings 20 due to the shaft vibration that arises during rotation of the rotor 13. According to Embodiment 1, because the gimbal bearings 6 that rotatably support the inner gimbal 9 on which the rotor 1 is disposed are disposed so as to be positioned on opposite sides of a plane that is perpendicular to the gimbal axis 7 and that includes the spin axis 5, moment loads due to shaft vibration that occurs in the rotor 1 are prevented from arising in the gimbal bearings 6. Thus, only radial loads act on the gimbal bearings 6. Because of that, the loads that act on the gimbal bearings 6 are reduced compared to the gimbal bearings 20 in the conventional CMG 200, enabling the working life of the gimbal bearings 6 to be designed for a long period.

In addition, in the conventional CMG 200, because the inner gimbal 18 exists in the load transmission pathway from the rotor 13 to the gimbal bearings 20, shaft vibration that arises in the rotor 13 is amplified due to resonance characteristics in the vibrational mode that gives rise to flexure relative to the shaft vibration of the inner gimbal 18, and is transmitted to the spacecraft. According to Embodiment 1, the inner gimbal 9 that is disposed between the spin bearing housings 4 and the gimbal bearings 6 in the axial direction of the spin axis 5 can be considered to be practically rigid in the range of vibrational frequencies that constitute a problem in spacecraft. Thus, because structural bodies in which flexure arises in response to shaft vibration of the rotor 1 do not exist along the load transmission pathway from the rotor 1 to the gimbal bearings 6, the magnitude of disturbances that act on the spacecraft can be kept extremely small since shaft vibration that arises in the rotor 1 will not be amplified while being transmitted from the rotor 1 to the spacecraft.

In the conventional CMG 200, since it is necessary to make the inner gimbal 18, which is in the load transmission pathway from the rotor 13 to the gimbal bearings 20, as rigid as possible, the inner gimbal 18 has a thick and rigid shape, thereby being increased in size and increased in weight. According to Embodiment 1, because the inner gimbal 9 is rigid against shaft vibration of the rotor 1 by configuration irrespective of its thickness and shape, dimensions of the inner gimbal 9 can be reduced, and it can also be reduced in weight.

In addition, in the conventional CMG 200, because the gimbal bearings 20 are disposed between the spin axis 16 and the torque module 21, and are disposed at a position near the spin axis 16 in particular, the mounted positions of the gimbal bearings 20 and the mounted position of the torque module 21 are far from the stator 22. The dimensions of the stator 22, on which the gimbal bearings 20 and the torque module 21 are disposed, are thereby lengthened in an axial direction of the gimbal axis 19, increasing the stator 22 in size. In addition to that, in order to drive the inner gimbal 18 to rotate using the torque module 21, it is necessary to dispose a gimbal shaft 23 on the inner gimbal 18 separately from the construction that is supported by the gimbal bearings 20, leading to increases in the size and the weight of the inner gimbal 18. Because the position of the torque module 21 that applies a driving torque to the inner gimbal 18 through the gimbal shaft 23 and the positions of the gimbal bearings 20 that rotatably support the inner gimbal 18 are also separated in the axial direction of the gimbal axis 7, it is necessary to additionally dispose second gimbal bearings 24 separately from the gimbal bearings 20 in a vicinity of the torque module 21 in order to stabilize and rotate the inner gimbal 18 smoothly, leading to additional increases in weight.

In contrast to that, according to Embodiment 1, because the gimbal bearings 6 are disposed so as to be positioned on opposite sides of a plane that is perpendicular to the gimbal axis 7 and that includes the spin axis 5, and the torque module 8 is disposed on the shaft axis of the spin axis 5 so as to be in close proximity to the gimbal bearings 6, the dimensions of the stator 10, on which the gimbal bearings 6 and the torque module 8 are disposed, can be shortened in the axial direction of the gimbal axis 7, enabling the stator 10 to be reduced in size. In addition, because it is not necessary to dispose a gimbal shaft separately in order to drive the inner gimbal 9 so as to rotate using the torque module 8, the inner gimbal 9 can be reduced in size, and since the second gimbal bearing 24 that was required in the conventional CMG 200 can also be eliminated, overall dimensions of the CMG 100 can be made thin and compact, and overall weight reductions can also be achieved in the CMG 100.

In addition, in the conventional CMG 200, the center of gravity of the entire conventional CMG 200 is at a position that is distanced from the spin axis 16 in an axial direction of the gimbal axis 19 due to arrangement of the torque module 21 relative to the spin axis 16. Because of that, even if an attempt is made to dispose the spacecraft interface 25 so as to include the center of gravity of the entire conventional CMG 200 such that flexural vibration is not induced in the conventional CMG 200 due to vibrational inputs such as sinusoidal vibration and random vibration during rocket launch, one problem is that it is not structurally possible to dispose the spacecraft interface 25 so as to achieve both support at the overall center of gravity of the conventional CMG 200 and shortening of the distance in the axial direction of the gimbal axis 19 from the spin axis 16 to the spacecraft interface 25.

In contrast to that, according to Embodiment 1, because the overall configuration of the CMG 100 is disposed so as to have rotational symmetry relative to the spin axis 5, the center of gravity of the entire CMG 100 is practically on the spin axis 5. Because of that, disposing the spacecraft interface 11 so as to support the overall center of gravity of the CMG 100 and shortening the distance from the spin axis 5 to the spacecraft interface 11 in the axial direction of the gimbal axis 7 can naturally be achieved by disposing the spacecraft interface 11 on the spin axis 5. Thus, one effect is that a CMG 100 is achieved that does not yield to the vibrational environment during rocket launch.

Embodiment 2

Figure 5:
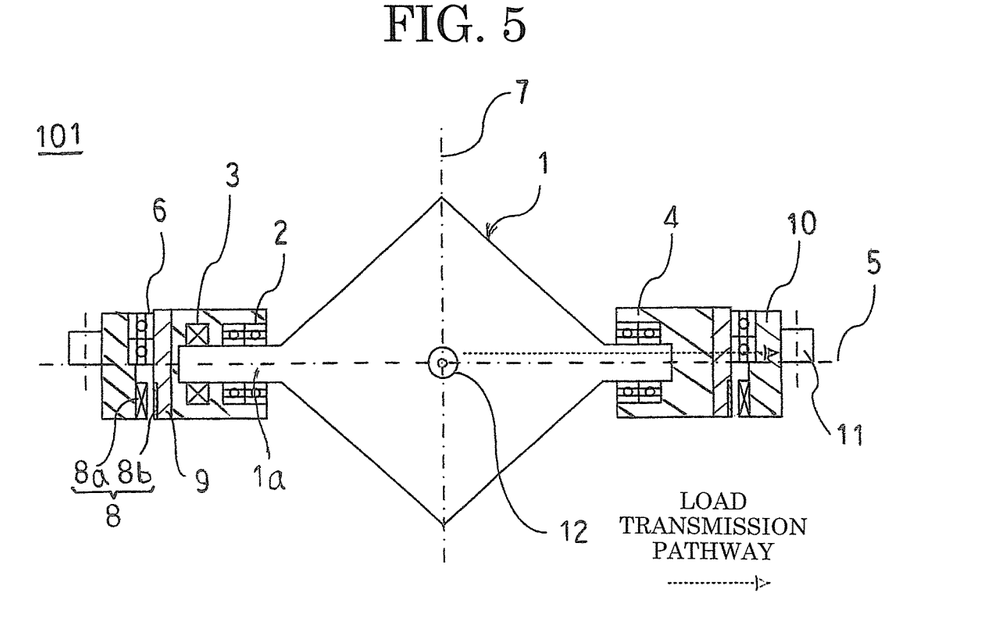
FIG. 5 is a cross section that shows a control moment gyroscope according to Embodiment 2 of the present invention.

FIG. 5 is a cross section that shows a control moment gyroscope according to Embodiment 2 of the present invention.

In FIG. 5, gimbal bearings 6 are disposed above a plane that is perpendicular to the gimbal axis 7 and that includes the spin axis 5 between the inner gimbal 9 and the stator 10 so as to contact the plane in question. A torque module 8 is disposed below the plane that is perpendicular to the gimbal axis 7 and that includes the spin axis 5 so as to be in close proximity to the gimbal bearings 6 on an opposite side of the plane in question. Here, the torque module 8 being "in close proximity" to the gimbal bearings 6 means a distance between the torque module 8 and the gimbal bearings 6 in the direction that is parallel to the shaft axis of the gimbal axis 7 is less than the largest dimension among a dimension of the torque module 8 in the direction that is parallel to the shaft axis of the gimbal axis 7 and a dimension of the gimbal bearings 6 in the direction that is parallel to the shaft axis of the gimbal axis 7.

Moreover, a remainder of the configuration is configured in a similar or identical manner to that of Embodiment 1 above.

A CMG 101 that is configured in this manner also operates in a similar or identical manner to the CMG 100 according to Embodiment 1 above. Because the gimbal bearings 6 are disposed so as to contact the shaft axis of the spin axis 5, moment loads do not arise on the gimbal bearings 6 due to shaft vibration that occurs in the rotor 1, and only radial loads act on the gimbal bearings 6. The inner gimbal 9 that is disposed between the spin bearing housings 4 and the gimbal bearings 6 in the axial direction of the spin axis 5 can be considered to be practically rigid in the range of vibrational frequencies that constitute a problem in spacecraft. Thus, a structural body in which flexure arises in response to the shaft vibration of the rotor 1 does not exist in the load transmission pathway from the rotor 1 to the gimbal bearings 6. Because the gimbal bearings 6 are disposed so as to be positioned so as to contact the shaft axis of the spin axis 5, and the torque module 8 is disposed so as to be in close proximity to the gimbal bearings 6, and the gimbal bearings 6 and the torque module 8 are disposed so as to be positioned on opposite sides of the shaft axis of the spin axis 5, the dimensions of the stator 10, on which the gimbal bearings 6 and the torque module 8 are disposed, can be shortened in the axial direction of the gimbal axis 7, enabling the stator 10 to be reduced in size. In addition, because it is not necessary to dispose a gimbal shaft separately in order to drive the inner gimbal 9 so as to rotate using the torque module 8, the inner gimbal 9 can be reduced in size. Consequently, similar or identical effects to those in Embodiment 1 above can also be achieved in Embodiment 2.

According to Embodiment 2, although the overall configuration of the CMG 101 does not have an arrangement that is rotationally symmetrical around the spin axis 5, unlike Embodiment 1 above, the center of gravity of the entire CMG 101 is in a position that is relatively close to the spin axis 5 in a similar or identical manner to Embodiment 1 above. Thus, a configuration that does not yield to the vibration environment during rocket launch can be made by disposing the spacecraft interface 11 in a position that is close to the shaft axis of the spin axis 5.

According to Embodiment 2, it becomes possible to use a production-controlled pair of angular contact ball bearings as a pre-combined bearing when combining the pair of angular contact ball bearings that constitute the gimbal bearings 6. Thus, assembly control of the gimbal bearings 6 is facilitated, and adjustment of a preload on the gimbal bearings 6 is also facilitated. Since it is also unnecessary to dispose the torque module 8 between the pair of angular contact ball bearings that constitute the gimbal bearings 6, one effect is that constraints on the dimensions and arrangement of the torque module 8 are eliminated.

Moreover, in Embodiment 2 above, the gimbal bearings 6 are disposed so as to contact the shaft axis of the spin axis 5, that is, a plane that is perpendicular to the gimbal axis 7 and that includes the spin axis 5, but gimbal bearings 6 may be disposed such that the plane in question passes through an internal portion of the gimbal bearings 6, that is, so as to include the plane in question.

Embodiment 3

Figure 6:
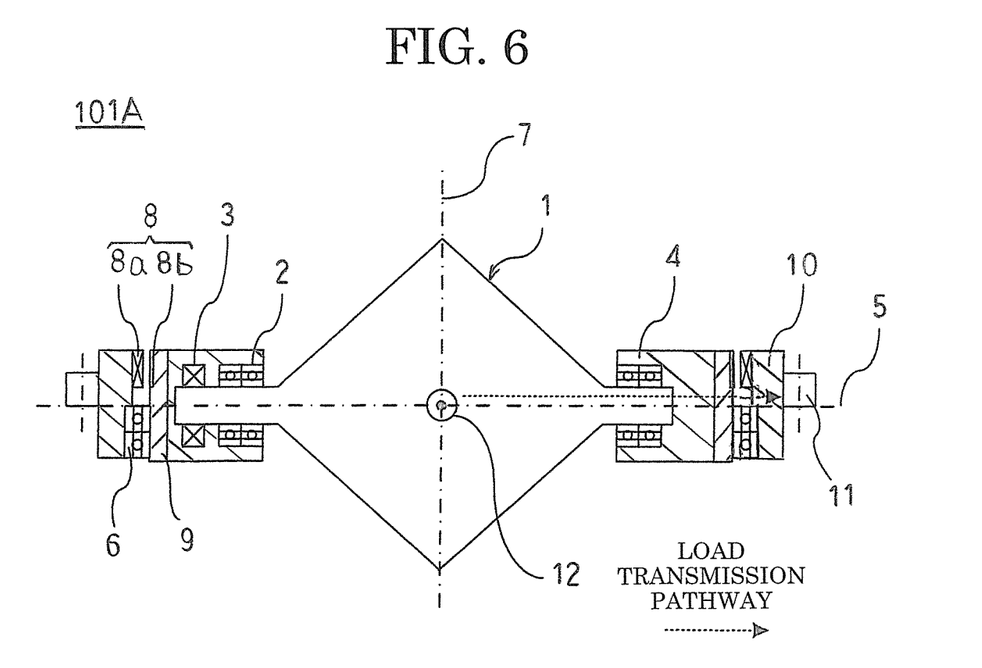
FIG. 6 is a cross section that shows a control moment gyroscope according to Embodiment 3 of the present invention.

FIG. 6 is a cross section that shows a control moment gyroscope according to Embodiment 3 of the present invention.

In FIG. 6, gimbal bearings 6 are disposed below a plane that is perpendicular to the gimbal axis 7 and that includes the spin axis 5 between the inner gimbal 9 and the stator 10 so as to contact the plane in question. A torque module 8 is disposed above the plane that is perpendicular to the gimbal axis 7 and that includes the spin axis 5 so as to be in close proximity to the gimbal bearings 6 on an opposite side of the plane in question. Here, the torque module 8 being "in close proximity" to the gimbal bearings 6 means a distance between the torque module 8 and the gimbal bearings 6 in the direction that is parallel to the shaft axis of the gimbal axis 7 is less than the largest dimension among a dimension of the torque module 8 in the direction that is parallel to the shaft axis of the gimbal axis 7 and a dimension of the gimbal bearings 6 in the direction that is parallel to the shaft axis of the gimbal axis 7.

Moreover, a remainder of the configuration is configured in a similar or identical manner to that of Embodiment 2 above.

In this manner, a CMG 101A according to Embodiment 3 is configured in a similar or identical manner to that of the CMG 101 according to Embodiment 2 except that the arrangement of the gimbal bearings 6 and the torque module 8 is reversed relative to the spin axis 5 and the spacecraft interface 11. Consequently, the CMG 101A also operates in a similar or identical manner to the CMG 101, and similar or identical effects can be achieved.

Embodiment 4

Figure 7:
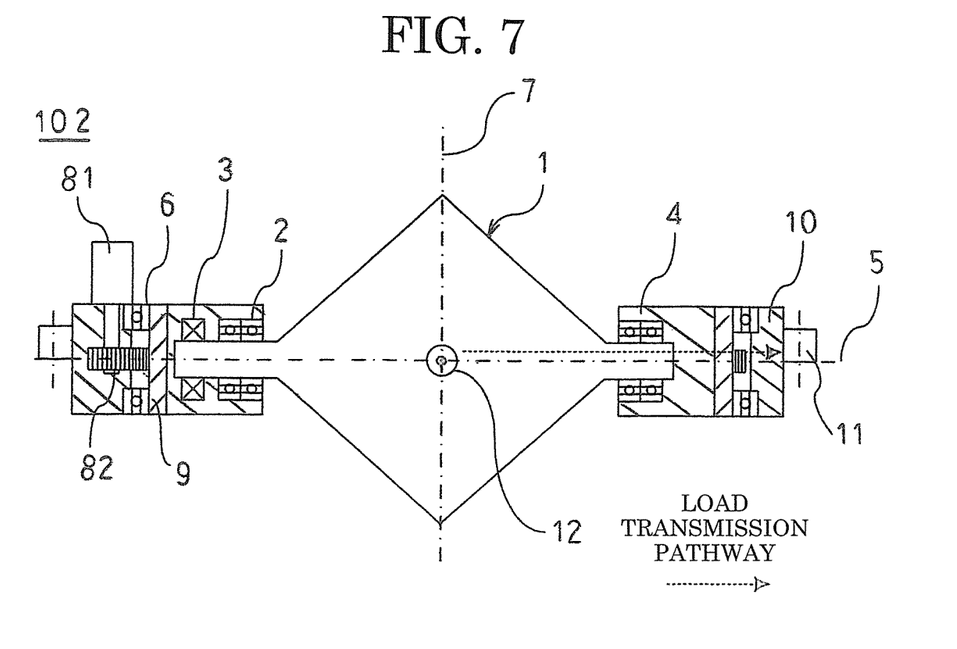
FIG. 7 is a cross section that shows a control moment gyroscope according to Embodiment 4 of the present invention.

FIG. 7 is a cross section that shows a control moment gyroscope according to Embodiment 4 of the present invention.

In FIG. 7, a torque module 81 is disposed on a side surface of a stator 10. A rotation transmitting mechanism 82 that transmits to the inner gimbal 9 torque that the torque module 81 outputs is disposed between the torque module 81 and the inner gimbal 9. The torque module 81 should be able to output rotational torque, and a motor can be used, for example. The rotation transmitting mechanism 82 should be able to transmit the rotational torque, and gears or a belt can be used, for example.

Moreover, a remainder of the configuration is configured in a similar or identical manner to that of Embodiment 1 above.

A CMG 102 that is configured in this manner also operates in a similar or identical manner to the CMG 100 according to Embodiment 1 above, and similar or identical effects can be achieved.

According to Embodiment 4, because a torque module 81 is used that is constituted by a motor, for example, it is not necessary to dispose the gimbal motor stator 8a on which the excitation winding inside the torque module 8 is disposed around the entire circumference on the inner circumferential surface of the stator 10, and in addition it is no longer necessary to dispose the gimbal motor rotor 8b on which the permanent magnets are disposed around the entire circumference on the outer circumferential surface of the inner gimbal 9. Because of that, one effect is that costs for manufacturing the CMG 102 can be reduced since, in addition to improving assemblability of the torque module 81, the use of high-cost permanent magnets and excitation windings can be reduced significantly.

Moreover, in Embodiment 4 above, the torque module 81 is used instead of the torque module 8 in the CMG 100 according to Embodiment 1, but similar or identical effects can also be achieved using the torque module 81 instead of the torque module 8 in the CMG 101 or 101A according to Embodiment 2 or 3.

Embodiment 5

Figure 8:
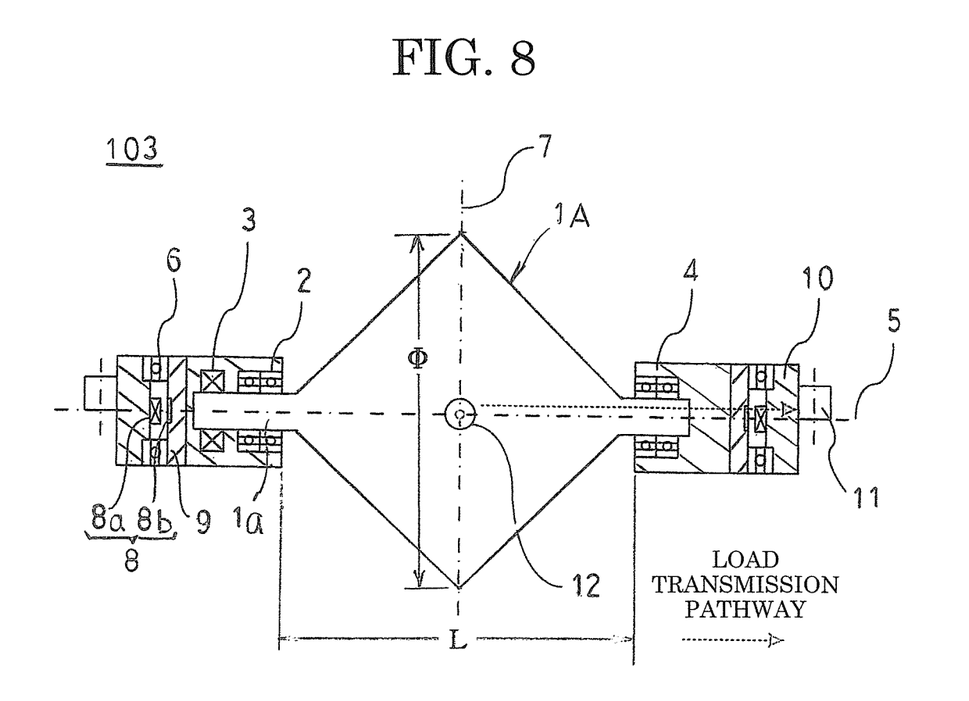
FIG. 8 is a cross section that shows a control moment gyroscope according to Embodiment 5 of the present invention.

FIG. 8 is a cross section that shows a control moment gyroscope according to Embodiment 5 of the present invention.

In FIG. 8, a maximum diameter $\Phi$ of a rotor 1A is configured so as to be approximately equal to a length L between two pairs of spin bearings 2 that rotatably support two ends of a shaft 1a.

Moreover, a remainder of the configuration is configured in a similar or identical manner to that of Embodiment 1 above.

A CMG 103 that is configured in this manner also operates in a similar or identical manner to Embodiment 1 above, and similar or identical effects to those of Embodiment 1 can be achieved.

According to Embodiment 5, space that the rotor 1A passes through during rotation around the spin axis 5 can be used more efficiently relative to space that is formed by the inner circumference of the inner gimbal 9. An additional effect is to increase the moment of inertia that the rotor 1A has because the diameter $\Phi$ of the rotor 1A is increased to close to the approximate maximum within a range that fits inside the inner circumference of the inner gimbal 9.

Moreover, in Embodiment 5 above, the rotor 1A is used instead of the rotor 1 in the CMG 100 according to Embodiment 1, but similar or identical effects can also be achieved using the rotor 1A instead of the rotor 1 in the CMG 101, 101A, or 102 according to Embodiment 2, 3, or 4.

Embodiment 6

Figure 9:
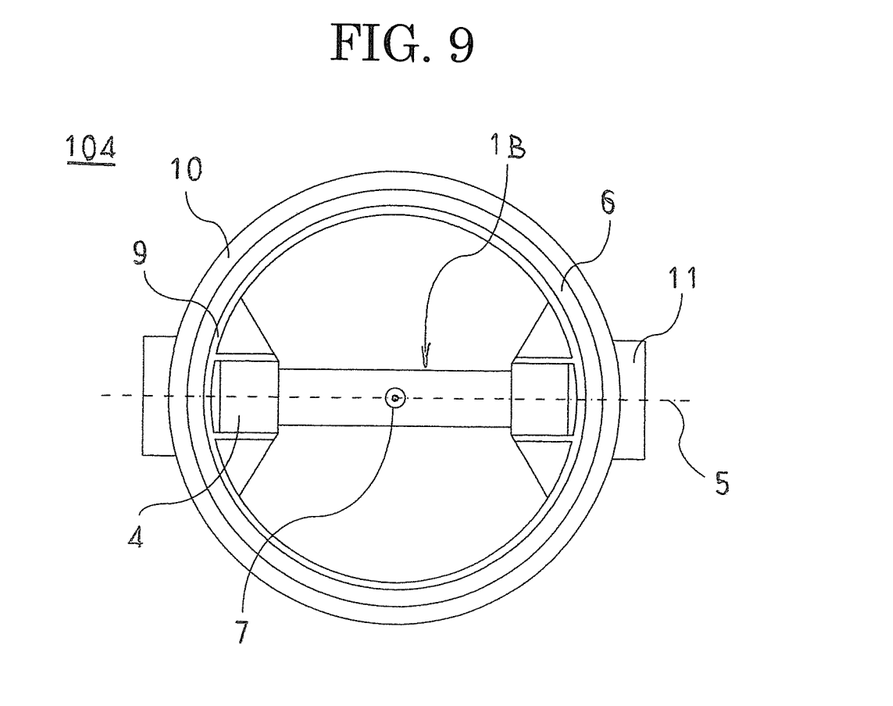
FIG. 9 is a top plan that shows a control moment gyroscope according to Embodiment 6 of the present invention.
Figure 10:
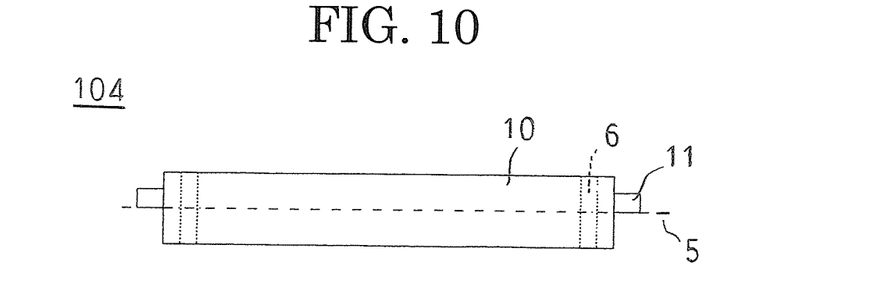
FIG. 10 is a side elevation that shows the control moment gyroscope according to Embodiment 6 of the present invention.

FIG. 9 is a top plan that shows a control moment gyroscope according to Embodiment 6 of the present invention, and FIG. 10 is a side elevation that shows the control moment gyroscope according to Embodiment 6 of the present invention.

In FIGS. 9 and 10, an outside diameter of a rotor 1B is configured so as to be less than or equal to a dimension of a member that is longest in an axial dimension of a gimbal axis 7 among a spin bearing housing 4, an inner gimbal 9, and a stator 10.

Moreover, a remainder of the configuration is configured in a similar or identical manner to that of Embodiment 1 above.

A CMG 104 that is configured in this manner also operates in a similar or identical manner to Embodiment 1 above, and similar or identical effects to those of Embodiment 1 can be achieved.

According to Embodiment 6, because the maximum outside diameter of the rotor 1B is less than or equal to the dimension of the member that is longest in the axial dimension of the gimbal axis 7 among the spin bearing housing 4, the inner gimbal 9, and the stator 10, the rotor 1B will not protrude beyond the member that is longest in the axial dimension of the gimbal axis 7 among the spin bearing housing 4, the inner gimbal 9, and the stator 10. Thus, dimensions of a CMG 104 in the axial direction of the gimbal axis 7 are greatly reduced, significantly improving mountability to the spacecraft. In addition, since the shape of the rotor 1B is a cylindrical shape that is approximately concentric with the shaft 1a of the rotor 1B, manufacturing is facilitated, and since complicated machining and assembly processes using welding are no longer necessary, one effect is that static and dynamic imbalances inside the rotor 1B can be greatly reduced.

Moreover, in Embodiment 6 above, the rotor 1B is used instead of the rotor 1 in the CMG 100 according to Embodiment 1, but similar or identical effects can also be achieved using the rotor 1B instead of the rotor 1 in the CMG 101, 101A, or 102 according to Embodiment 2, 3, or 4.

Embodiment 7

Figure 11:
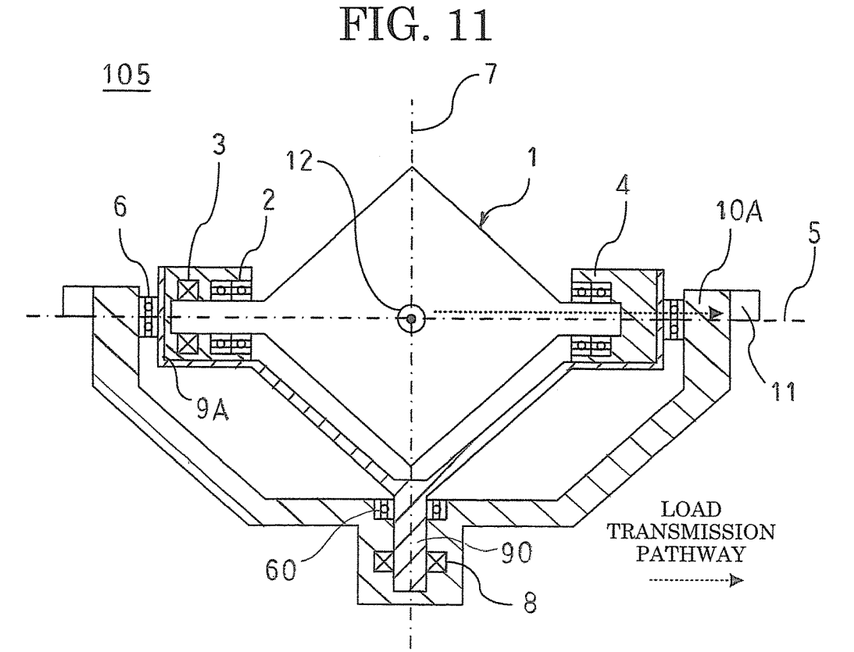
FIG. 11 is a cross section that shows a control moment gyroscope according to Embodiment 7 of the present invention.

FIG. 11 is a cross section that shows a control moment gyroscope according to Embodiment 7 of the present invention.

In FIG. 11, an inner gimbal 9A includes a gimbal shaft 90 that is coaxial to a gimbal axis 7 below a rotor 1, and is supported on a stator 10A by gimbal bearings 6 and 60 so as to be rotatable around the gimbal axis 7. A pair of angular contact ball bearings that constitute the gimbal bearings 6 are disposed between the inner gimbal 9A and the stator 10A so as to be positioned on opposite sides of a plane that is perpendicular to the gimbal axis 7 and that includes a spin axis 5 so as to contact the plane in question. A torque module 8 is disposed inside the stator 10A so as to drive the gimbal shaft 90 to rotate.

Moreover, a remainder of the configuration is configured in a similar or identical manner to that of Embodiment 1 above.

A CMG 105 that is configured in this manner also operates in a similar or identical manner to the CMG 100 according to Embodiment 1 above.

According to Embodiment 7, because the gimbal bearings 6 that rotatably support the inner gimbal 9A on which the rotor 1 is disposed are disposed so as to be positioned on opposite sides of a plane that is perpendicular to the gimbal axis 7 and that includes the spin axis 5, moment loads due to shaft vibration that occurs in the rotor 1 are prevented from arising in the gimbal bearings 6. Thus, only radial loads act on the gimbal bearings 6, enabling the working life of the gimbal bearings 6 to be designed for a long period.

The inner gimbal 9A that is disposed between the spin bearing housings 4 and the gimbal bearings 6 in the axial direction of the spin axis 5 can be considered to be practically rigid in the range of vibrational frequencies that constitute a problem in spacecraft. Thus, a structural body in which flexure arises in response to the shaft vibration of the rotor 1 does not exist in the load transmission pathway from the rotor 1 to the gimbal bearings 6. Because of that, the magnitude of disturbances that act on the spacecraft can be kept extremely small since shaft vibration that arises in the rotor 1 will not be amplified while being transmitted from the rotor 1 to the spacecraft.

Because the inner gimbal 9A is disposed between the spin bearing housings 4 and the gimbal bearings 6 in the axial direction of the spin axis 5, it is rigid against shaft vibration of the rotor 1 by configuration irrespective of its thickness and shape. Thus, dimensions of the inner gimbal 9A can be reduced, enabling the CMG 105 to be reduced in size.

In Embodiment 7, because the mounted positions of the gimbal bearings 6 and the mounted position of the torque module 8 are farther apart, dimensions of the stator 10A in the axial direction of the gimbal axis 7 are larger. However, since the diameter of the gimbal shaft 90 of the inner gimbal 9 can be set smaller, the size of the torque module 8 can be reduced, making it unnecessary to provide a particularly large-diameter torque module 8.

Moreover, in Embodiment 7 above, the inner gimbal 9A and the stator 10A are used instead of the inner gimbal 9 and the stator 10 in the CMG 100 according to Embodiment 1, but similar or identical effects can also be achieved using the inner gimbal 9A and the stator 10A instead of the inner gimbal 9 and the stator 10 in the CMG 101, 101A, 102, 103, or 104 according to Embodiment 2, 3, 4, 5 or 6.

Embodiment 8

Figure 12:
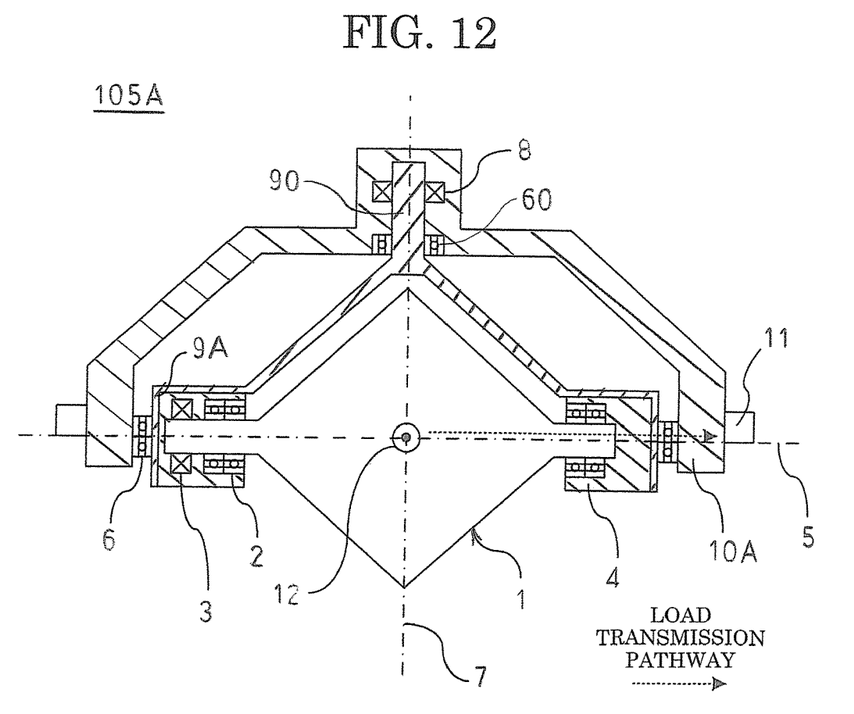
FIG. 12 is a cross section that shows a control moment gyroscope according to Embodiment 8 of the present invention.

FIG. 12 is a cross section that shows a control moment gyroscope according to Embodiment 8 of the present invention.

In FIG. 12, an inner gimbal 9A includes a gimbal shaft 90 that is coaxial to a gimbal axis 7 above a rotor 1, and is supported on a stator 10A by gimbal bearings 6 and 60 so as to be rotatable around the gimbal axis 7. A pair of angular contact ball bearings that constitute the gimbal bearings 6 are disposed between the inner gimbal 9A and the stator 10A so as to be positioned on opposite sides of a plane that is perpendicular to the gimbal axis 7 and that includes a spin axis 5 so as to contact the plane in question. A torque module 8 is disposed inside the stator 10A so as to drive the gimbal shaft 90 to rotate.

Moreover, a remainder of the configuration is configured in a similar or identical manner to that of Embodiment 7 above.

In this manner, a CMG 105A according to Embodiment 8 is configured in a similar or identical manner to that of the CMG 105 according to Embodiment 7 except that the arrangement of the gimbal bearings 6 and the torque module 8 is reversed relative to the spin axis 5 and the spacecraft interface 11. Consequently, the CMG 105A also operates in a similar or identical manner to the CMG 105, and similar or identical effects can be achieved.

Moreover, in Embodiment 8 above, similar or identical effects can also be achieved using the inner gimbal 9A and the stator 10A instead of the inner gimbal 9 and the stator 10 in the CMG 101, 101A, 102, 103, or 104 according to Embodiment 2, 3, 4, 5 or 6, in a similar or identical manner to Embodiment 7 above.

The invention claimed is:

1. A control moment gyroscope to be disposed on a spacecraft, wherein said control moment gyroscope comprises:
    an inner gimbal;
    a rotor that is held by said inner gimbal so as to be rotatable around a spin axis;
    a spin motor that is disposed on said inner gimbal, and that rotates said rotor around said spin axis;
    a stator that holds said inner gimbal so as to be rotatable around a gimbal axis that is perpendicular to said spin axis;
    gimbal bearings that are disposed between said inner gimbal and said stator so as to face each other from opposite sides of a plane that is perpendicular to said gimbal axis and that includes said spin axis, so as to be in contact with said plane, or so as to include said plane; and
    a torque module that is disposed on said stator, and that rotates said inner gimbal around said gimbal axis,
    wherein said rotor has a shaft extending along said spin axis, and
    wherein said gimbal bearings are disposed outside of opposite ends of said shaft of said rotor when viewed along said gimbal axis.

2. The control moment gyroscope according to claim 1, wherein said torque module is disposed on said stator so as to be adjacent to said gimbal bearings.

3. The control moment gyroscope according to claim 2, wherein:

said gimbal bearings are disposed so as to be in contact with said plane; and said torque module is disposed so as to face said gimbal bearings.

4. The control moment gyroscope according to claim 1, wherein said gimbal bearings are constituted by two angular contact ball bearings that face each other from the opposite sides of said plane.

5. The control moment gyroscope according to claim 4, wherein said torque module is disposed between said two angular contact ball bearings.

6. The control moment gyroscope according to claim 1, further comprising an interface that connects said spacecraft and said stator, said interface being disposed so as to include said plane, so as to be in contact with said plane, or so as to be in proximity to said plane.

7. The control moment gyroscope according to claim 1, wherein a maximum diameter of said rotor is equal to a length between bearings that rotatably support the ends of said shaft of said rotor.

8. The control moment gyroscope according to claim 1, wherein a maximum diameter of said rotor is less than or equal to a maximum dimension among said stator and said inner gimbal in an axial direction of said gimbal axis.

* * * * *